United States Patent [19]

Irimajiri

[11] 4,362,135
[45] Dec. 7, 1982

[54] PISTON RING OF INTERNAL COMBUSTION ENGINE

[75] Inventor: Shoichiro Irimajiri, Kawagoe, Japan

[73] Assignee: Honda Giken Kogyo Kabushiki Kaisha, Tokyo, Japan

[21] Appl. No.: 262,350

[22] Filed: May 11, 1981

Related U.S. Application Data

[63] Continuation of Ser. No. 49,735, Jun. 18, 1979, abandoned.

[30] Foreign Application Priority Data

Jun. 26, 1978 [JP] Japan .............................. 53-86845[U]

[51] Int. Cl.³ ................................................ F16J 9/06
[52] U.S. Cl. ................................... 123/193 P; 92/177; 277/200
[58] Field of Search .............. 123/193 P, 193 R, 657; 92/177; 277/216, 200, 217

[56] References Cited

U.S. PATENT DOCUMENTS 2,257,417 9/1941 Kelley ..................................... 92/177
2,409,555 10/1946 Gadoux et al. ........................ 92/177
2,474,493 6/1949 Phillips ................................. 277/200
2,569,778 10/1951 Phillips ................................. 277/216
2,766,085 10/1956 Muller .................................. 277/217
2,970,022 1/1961 Anderson ............................. 277/200
4,045,036 8/1977 Shunta ................................. 277/200
4,053,165 10/1977 Hartley ................................ 277/216
4,206,930 6/1980 Thrane et al. ....................... 277/216

Primary Examiner—Craig R. Feinberg
Attorney, Agent, or Firm—Lyon & Lyon

[57] ABSTRACT

An internal combustion engine is provided with at least one oblong cylinder and an oblong piston mounted to reciprocate therein. A piston ring is positioned within an annular piston ring groove formed in the piston, the piston ring including an outer ring in contact with the cylinder, an inner ring and a biasing means such as a corrugated plate spring positioned between the inner ring and the outer ring. The inner ring is normally slightly spaced apart from the inner periphery of the piston ring groove so that the piston ring is allowed to be laterally displaced the amount of such spacing during piston oscillation, thereby providing improved sealing between the piston and cylinder.

2 Claims, 2 Drawing Figures

PISTON RING OF INTERNAL COMBUSTION ENGINE

This is a continuation of application Ser. No. 49,735, filed June 18, 1979 now abandoned.

This invention relates to a piston ring for an internal combustion engine having a piston and cylinder which are oblong in cross section. The advantage of such a piston and cylinder configuration were set out in greater detail in earlier filed U.S. patent application Ser. No. 22,942, titled "Oblong Piston and Cylinder for Internal Combustion Engine," now U.S. Pat. No. 4,256,068 granted Mar. 17, 1981, and hereby incorporated by reference. See also, U.S. patent application Ser. No. 22,801, also filed in the names of Shoichiro Irmajiri and Takeo Fukui on Mar. 22, 1979, titled "Connecting Rods for Oblong Piston for Internal Combustion Engine", and U.S. patent application Ser. No. 22,802, titled "Piston Ring for Internal Combustion Engine", now U.S. Pat. No. 4,198,065 granted Apr. 15, 1980. The present application is concerned with the construction of a piston ring or rings for an oblong piston which achieve substantially uniform pressure distribution even under conditions of piston oscillation which may occur during high speed operation.

Figure 1:
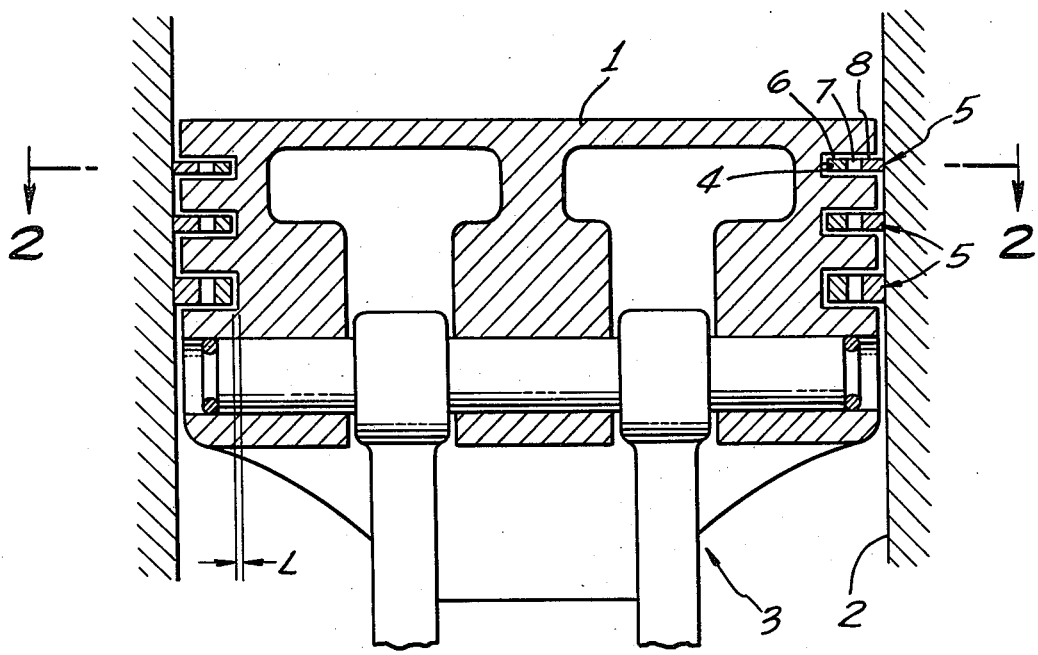
FIG. 1 is a partial cross sectional view illustrating the subject matter of this invention.
Figure 2:
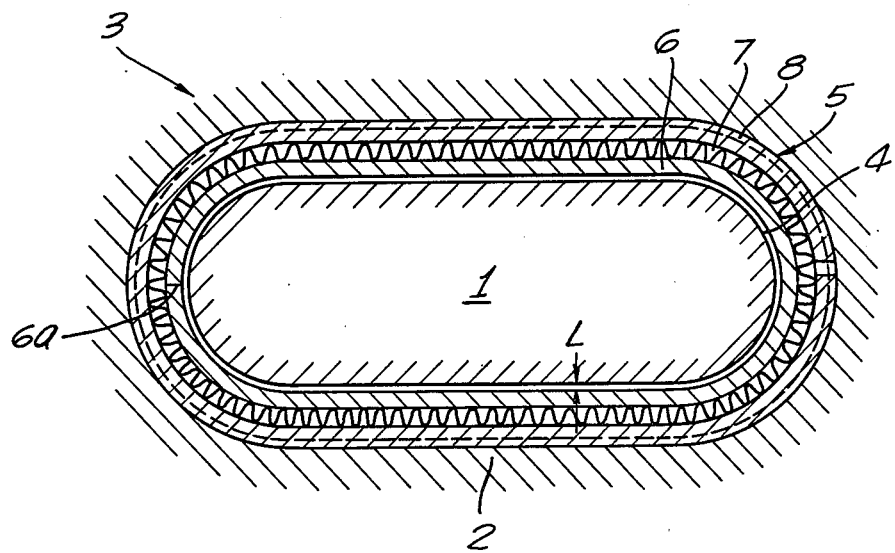
FIG. 2 is a sectional detail taken substantially along lines 2—2 of FIG. 1.

Referring now to FIGS. 1 and 2, an oblong piston 1 is shown mounted to reciprocate within an oblong cylinder 2. Piston rings, generally referred to as 5, are shown positioned within an annular piston ring groove 4 formed in the piston 1. The piston ring 5 is comprised of three layers, an outer ring 8, inner ring 6 and a resilient expander member, preferably a corrugated plate spring 7, positioned between the outer ring 8 and the inner ring 6. As shown most clearly in FIG. 1, a plurality of piston rings 5 may be utilized within an equal number of piston grooves 4. The inner ring 6 is preferably spaced slightly apart from the inner periphery of the piston ring groove 4 under normal or at rest conditions. This spacing is indicated by the notation "L" as shown in FIGS. 1 and 2. As shown in FIG. 2, inner ring 6 may be substantially continuous throughout the annular groove 4, with ends in abutting relationship as shown at 6a. The inner ring 6 is preferably of a material having a high degree of stiffness.

The structure of the invention having been described, its operation will now be discussed. Should the piston 1 develop oscillation within the cylinder 2, as for example during high speed conditions, such that the piston 1 moves laterally within the cylinder 2, the piston ring 5 moves laterally in the direction opposite to the lateral motion movement of the piston 1. The limit of such movement is defined by the clearance "L" present between the inner ring 6 and the piston groove 4. Thus the load of the corrugated plate spring 7 positioned between the inner ring 6 and the outer ring 8 can be distributed equally.

Having fully described my invention, it is to be understood that I am not to be limited to the details herein set forth but that the scope of my invention is to be determined by claims appended hereto.

What is claimed is:

1. An internal combustion engine having an oblong cylinder wall and an oblong piston mounted to reciprocate therein, a continuous piston ring groove formed in said piston, an oblong piston ring assembly positioned within said groove and comprising three discrete rings, an outer ring, an inner ring and an intermediate resilient expander ring, said outer ring provided with an outer periphery in surface contact with said cylinder wall, said inner ring being formed of a material having a high degree of stiffness and substantially continuous about the periphery of said piston ring groove, with only one pair of ends said ends being in abutting relationship, said resilient expander ring being formed of a corrugated plate spring and supported on said inner ring to exert a predetermined expanding force on said outer ring, said inner ring being normally spaced from the inner periphery of said piston ring groove so that lateral displacement of said piston ring assembly is limited by the amount of said spacing during any lateral movement of the piston, thereby equally distributing the load of the corrugated plate spring of said expander ring positioned between the inner ring and the outer ring wherein said outer ring has only one pair of ends defining a single gap therebetween, said gap being positioned opposite from the ends of said inner ring along a central long axis of said oblong piston.

2. The internal combustion engine as claimed in claim 1 wherein said expander member of corrugated plate spring ring comprises inner crests in contact with said inner ring and outer crests in contact with said outer ring.

* * * * *